March 24, 1970   W. J. WEINFURT   3,503,025

COOLING MEANS FOR UNDERGROUND TRANSFORMER

Filed Dec. 6, 1968

INVENTOR
WILLIAM J. WEINFURT

BY Richard C. Ruppin
ATTORNEY

United States Patent Office 3,503,025
Patented Mar. 24, 1970

3,503,025
COOLING MEANS FOR UNDERGROUND TRANSFORMER
William J. Weinfurt, Elm Grove, Wis., assignor to McGraw-Edison Company, Elgin, Ill., a corporation of Delaware
Filed Dec. 6, 1968, Ser. No. 781,808
Int. Cl. H01f 27/10
U.S. Cl. 336—57                                 9 Claims

ABSTRACT OF THE DISCLOSURE

A transformer for mounting below ground level and utilizing an insulating fluid as a coolant. The casing of the transformer has a tube extending into the ground and a circulating pipe is positioned within the tube and extending into the casing. A pump circulates insulating fluid which has been heated due to operation of the transformer through the pipe and the tube where the heated fluid is cooled by radiation of its heat through the tube wall into the ground.

---

Figure 1:
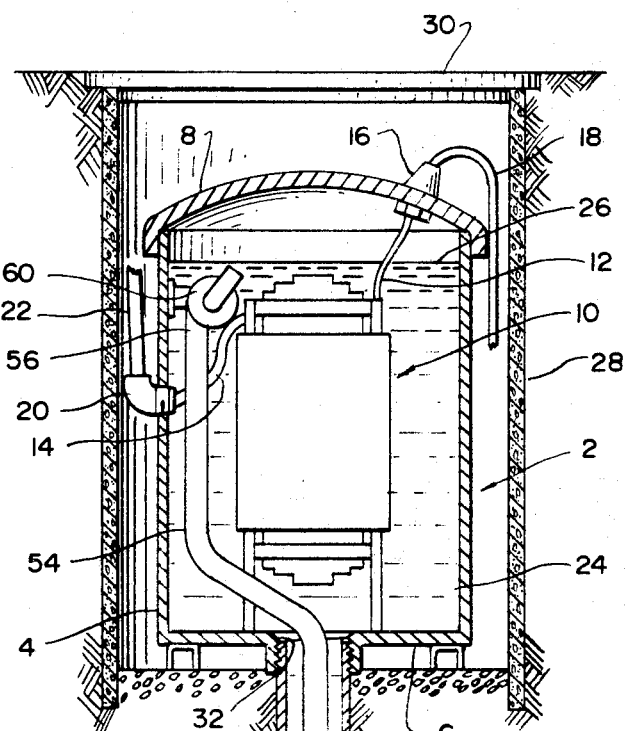

This invention relates to underground transformer apparatus and, in particular, to cooling means for a transformer mounted below ground level.

Overhead distribution systems are esthetically displeasing and detract from the beauty of residential areas. In an attempt to improve the esthetic appearance of distribution systems, electric utilities have installed buried cable with distribution transformers enclosed in metallic housings supported on concrete pads at ground level. An underground distribution system minimizes the problem of wind, ice, and tree limb damage and reduces the likelihood of lightning damage. However, the high cost of an underground system in comparison to overhead systems has somewhat limited wide spread adoption of underground distribution systems for residential service. The metallic housings for distribution transformers supported on concrete pads at ground level are expensive and time-consuming to construct, particularly in that they require forms for the concrete pad and inherently involve delay while the poured concrete sets. Further, such metallic housings detract from the appearance of the residential area and are a potential source of danger.

Utilities have also installed electrical transformers below ground level, either within vaults or buried directly in the soil. Whether the transformer is buried directly in the soil or mounted within a vault, a problem arises in the cooling of the transformer. Where the transformer is directly buried in the ground there is no air circulation for removal of the heat which is developed within the transformer. Further, when the transformer is directly buried within the ground, the ground is generally unable to properly dissipate the heat developed by the transformer. When the transformer is mounted within a vault, only limited air circulation can be obtained for cooling purposes. Both the practicable vault size and clogging of the grated vault cover are limiting factors in the amount of air cooling that can be obtained where the transformer is mounted within a vault. In order to improve the practicability of directly buried or vault mounted transformers, it is necessary to provide a means for cooling such transformers which is inexpensive to use and is efficiently and readily utilized with such transformers.

It is accordingly a principal object of this invention to provide a transformer located below ground level with a novel cooling means.

It is a further object of this invention to provide a cooling means for a transformer mounted below ground level which can be inexpensively and readily utilized with the transformer.

Another object of this invention is to provide a cooling means for use with a transformer mounted below ground level which has a relatively inexpensive and simple construction.

The objects of the invention are accomplished by providing an opening in a wall of a transformer casing and a cooling tube enclosing the opening and extending from the transformer into the ground. A circulating pipe having a smaller diameter is also positioned within the cooling tube and extends into the transformer casing. The transformer casing contains insulating fluid which is heated by the operation of the transformer and the heated insulating fluid is circulated by a pump through the circulating pipe and the cooling tube where it is cooled by radiating heat through the tube wall into the ground. Although the transformer casing itself provides a heat exchange area for cooling the fluid, the cooling tube greatly increases the total heat exchange area and correspondingly increases the cooling of the fluid.

Figure 2:
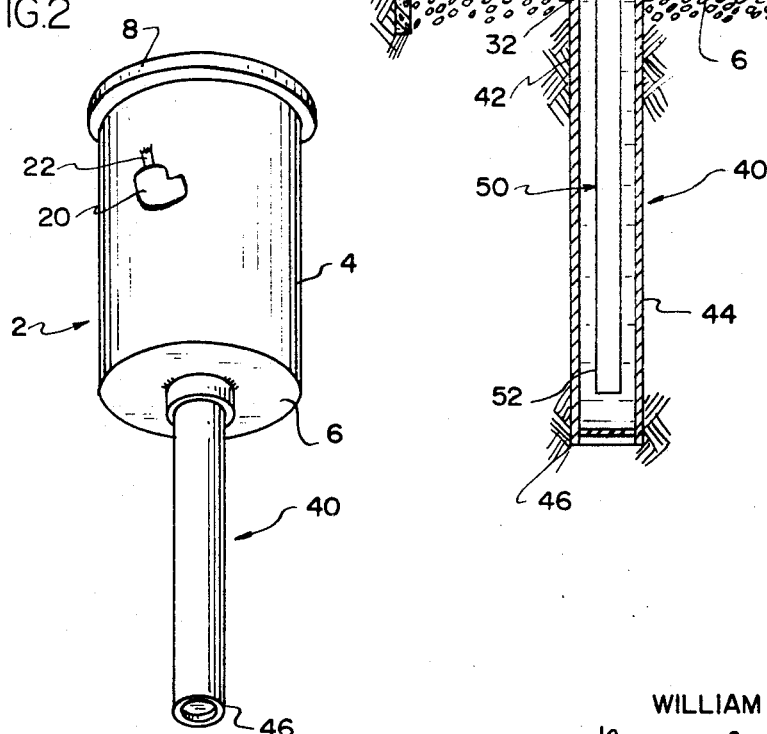

These and other objects and advantages of the invention will be more readily apparent from the following detailed description when taken in conjunction with the accompanying drawings wherein:

FIG. 1 is vertical sectional view of a transformer, including the cooling means of the invention, mounted within a vault; and FIG. 2 is a perspective view of a transformer including a preferred embodiment of the invention.

Referring to the drawing, a transformer apparatus is shown which includes a transformer casing 2 having a cylindrical wall 4, a bottom wall 6 and an upper wall or cover 8 sealed and held against cylindrical wall 4 by suitable means (not shown). A transformer core and coil assembly 10 is mounted within the transformer casing 2 and is provided with primary leads 12 and secondary leads 14, only one of each type of lead being shown. A primary lead 12 is brought out to a primary bushing 16 and the primary cable 18 is shown extending from the bushing 16 for connection to a distribution system. A secondary lead 14 is connected to the secondary bushing 20 and the secondary cable 22 extends from the bushing 20 for connection to the load. A suitable dielectric insulating fluid 24 fills the transformer casing 2 to a level 26 above the core and coil assembly. The transformer casing 2 is mounted below ground level within the vault 28 which is provided with a grated cover 30. It should be understood, however, that the invention also comprehends the direct burial of the transformer apparatus including casing 2 within the soil.

The transformer wall 6 is provided with an opening 32 and a cooling tube 40 encloses the opening 32 and is attached to the transformer casing 2 in communication with the interior of the transformer casing 2 through the opening 32. The cooling tube 40 has an end or portion 42 extending away from the casing 2, a wall 44 and a closed end 46 spaced from casing 2. In FIG. 1, the cooling tube 40 is shown extending from the casing 2 vertically into the ground, however, it should be understood that at least some of the benefit of the cooling tube may be obtained without having it extend into the ground or vertically into the ground. A circulating pipe 50 is positioned preferably coaxially within the cooling tube 40 and has an end 52 positioned preferably adjacent the end 46 of the cooling tube 40 and a portion 54 extending into the transformer casing 2. The circulating pipe 50 has an end 56 positioned within the insulating fluid 24 adjacent the fluid level 26 and connected to a circulating pump 60. The circulating pump 60 is supported by the transformer casing 2 either directly or on the end 56 of the pipe 50 which in turn may be supported by the casing 2. When a load is applied to the secondary cables 22, the core and coil assembly 10 will be energized and incur losses which will raise its temperature and thereby heat the insulating fluid 24. The heated insulating fluid 24 will rise toward the level 26 of the fluid where the circulating pump 60 will pump the fluid 24 into the pipe 50, through the cooling tube 40 and back into the casing 2. The insulating fluid 24 is thus circulated out of and back into the casing 2 through the cooling tube 40 where the heater fluid 24 is cooled by the radiation of its heat through the wall 44 of the tube 40 into the ground. Although the circulating pump 60 is shown in FIG. 1 as being positioned within the casing 2, it should be understood that it may be located within or without the casing 2 at any position which will allow it to circulate the insulating fluid 24 into and out of the cooling tube 40.

The utilization of the cooling means of the invention results in a substantially increased heat exchange surface area to provide a greater cooling effect for the insulating fluid 24 within the transformer apparatus. By positioning the circulating pipe 50 within a cooling tube 40, a compact and readily installable cooling means is provided. Where the transformer apparatus including the improved cooling means is installed in a vault 28, heat from the insulating fluid 24 can be dissipated both to the air through the casing walls of the apparatus and to the ground through the walls of a device such as cooling tube 40. A further advantage of the embodiment of the invention as shown in FIG. 1 is that the hole for the cooling tube 40 can be economically and readily made by a commonly available tool such as an earth auger.

While only a single specific embodiment of the invention has been shown herein, it will be realized that many modifications thereof are feasible without departing from the spirit and scope of the invention. It is consequently intended in the appended claims to cover all such variations and modifications as fall within the true spirit and scope of the invention.

What is claimed is:

1. In a transformer apparatus located below ground level and having a casing, a core and coil assembly mounted within said casing and insulating fluid covering said core and coil assembly and heated by the operation of said core and coil assembly, the combination wherein said casing has a wall provided with an opening therein and a cooling tube having a portion spaced from the casing wall and an end positioned in communication with said opening, a pipe having an end positioned within said portion of the coolng tube and an end extending into said casing and means for circulating said insulating fluid through the pipe and cooling tube whereby the insulating fluid is cooled by heat radiation through the walls of said cooling tube as it passes through the tube.

2. The combination according to claim 1 wherein said insulating fluid fills said casing to a level covering the core and coil assembly and the heated insulating fluid rises within said casing to a position adjacent said level, the end of said pipe extending into said casing is positioned adjacent said level and said means circulates insulating fluid adjacent said level through the pipe and cooling tube.

3. The combination according to claims 1 or 2 wherein said cooling tube extends from said casing into the ground.

4. The combination according to claims 1 or 2 wherein said means comprises a pump mounted within said casing.

5. The combination according to claim 2 wherein said means comprises a pump positioned adjacent said level of the insulating liquid and connected to the end of the pipe extending into said casing.

6. In a transformer apparatus located below ground level and having a casing, a core and coil assembly mounted within said casing and insulating fluid filling said casing to a level covering said core and coil assembly and heated by the operation of said core and coil assembly, the combination of a wall in said casing having an opening positioned below the level of said insulating fluid, a cooling tube attached to said casing and having a closed end extending away from said casing and an end enclosing said opening, a recirculating pipe positioned within said cooling tube and having an open end positioned adjacent the closed end of said tube and an end extending into said casing and pump means supported by said casing for circulating said insulating fluid through the recirculating pipe and cooling tube whereby the insulating fluid is cooled by heat radiation through the walls of said tube as it passes through the tube.

7. The combination according to claim 6 wherein said cooling tube extends vertically downward from said casing into the ground and heat from the insulating fluid is radiated into the ground.

8. The combination according to claims 6 or 7 wherein said pump means is positioned within said casing and pumps the insulating fluid through the cooling tube and recirculating pipe.

9. The combination according to claims 6 or 7 wherein said pump means is positioned within said casing below and adjacent to the level of said insulating fluid and is connected to the end of said pipe extending into the casing to circulate said fluid through said pipe and cooling tube.

References Cited

UNITED STATES PATENTS

| 1,706,574 | 3/1929 | Hodtum | 336—57 XR |
| 1,798,702 | 3/1931 | Roebel | 336—58 XR |

FOREIGN PATENTS 910,695   5/1954   Germany.

THOMAS J. KOZMA, Primary Examiner

U.S. Cl. X.R.

174—15, 37; 336—61